(12) United States Patent
Ionov

(10) Patent No.: US 6,600,844 B2
(45) Date of Patent: Jul. 29, 2003

(54) HIGHLY LINEAR ELECTRO-OPTIC DELAY GENERATOR FOR ALL-OPTICAL PULSE-POSITION MODULATION

(75) Inventor: Stanislav I. Ionov, Calabasas, CA (US)

(73) Assignee: HRL Laboratories, LLC, Malibu, CA (US)

(*) Notice: Subject to any disclaimer, the term of this patent is extended or adjusted under 35 U.S.C. 154(b) by 114 days.

(21) Appl. No.: 09/896,953

(22) Filed: Jun. 29, 2001

(65) Prior Publication Data

US 2003/0025986 A1 Feb. 6, 2003

(51) Int. Cl.[7] .............................. G02F 1/295; G02B 6/26
(52) U.S. Cl. ................................ 385/9; 385/10; 385/8; 359/315
(58) Field of Search ........................... 359/315; 385/10, 385/50, 4, 6, 7, 8, 9, 39; 372/99, 45, 46, 50; 357/98; 257/83, 97, 94

(56) References Cited

U.S. PATENT DOCUMENTS

| | | | | |
|---|---|---|---|---|
| 3,961,841 A | | 6/1976 | Giordmaine | ................. 359/264 |
| 5,751,466 A | | 5/1998 | Dowling et al. | ............ 359/248 |
| 6,243,517 B1 | * | 6/2001 | Deacon | ........................ 385/50 |
| 6,466,703 B1 | * | 10/2002 | Ionov | ........................... 385/10 |

FOREIGN PATENT DOCUMENTS

EP    0545401    6/1993
WO    01/78200   10/2001

OTHER PUBLICATIONS

Gupta, K.C., "Microstrip Lines II: Fullwave Analyses, Design Considerations, and Applications," *Microstrip Lines and Slotlines*, 2nd edition, pp. 61–115 (1996).

Jinguji, Kaname. "Synthesis of Coherent Two–Port Optical Delay–Line Circuit with Ring Waveguides," *Journal of Lightwave Technology, IEEE*, vol. 14, No. 8, pp 1882–1898 (Aug. 1996).

* cited by examiner

*Primary Examiner*—Georgia Epps
*Assistant Examiner*—Omar Hindi
(74) *Attorney, Agent, or Firm*—Ladas & Parry (57) ABSTRACT

An optical delay generator comprises a first waveguide made from electro-optically active material resonantly coupled to a second non-electro-optically active waveguide. The first waveguide contains a chirped distributed Bragg reflector structure which reflects optical signals at a specific wavelength at a specific reflection point within the structure. An electric field applied to the first waveguide changes the refractive index of the electro-optically active material and thus shifts the reflection point. Optical signals reflecting from the reflection point are resonantly coupled into the second waveguide, and are thus not affected by the electric field applied to the first waveguide. The controllable optical delay applied to the optical signals results from control over the reflection point and the round-trip travel time for an optical signal forward propagating in the first waveguide, being reflected at the reflection point, and backward propagating in the second waveguide.

29 Claims, 5 Drawing Sheets

Position along direction of propagation (z)

HIGHLY LINEAR ELECTRO-OPTIC DELAY GENERATOR FOR ALL-OPTICAL PULSE-POSITION MODULATION

FIELD OF THE INVENTION

The present invention relates to the field of optical communications and, more specifically, to the modulation of optical pulse streams. In particular, the modulation of the pulse streams is obtained by applying controlled delays to the optical pulses in the pulse stream.

BACKGROUND OF THE INVENTION

Many satellite and terrestrial optical communication systems require transmission of analog optical signals. The straightforward way to transmit an analog optical signal is to modulate the amplitude of an optical carrier. This approach, however, suffers from poor signal-to noise ratio (SNR). It is well known that broadband modulation techniques, which utilize higher bandwidth than that of the transmitted waveform, may improve the SNR over that achieved with amplitude modulation. Pulse Position Modulation (PPM) is one of these techniques. In PPM, an optical pulse stream samples an analog signal. A temporal shift in the pulse position of each optical pulse represents a sample of the transmitted waveform. Thus, the temporal position of each pulse is shifted from its unmodulated position in proportion to the amplitude of the analog signal. The improvement in SNR near the Nyquist sampling frequency of a pulse position modulated signal over an amplitude-modulated signal is shown below:

$$SNR_{PPM} \propto SNR_{AM}(t_p/\tau)^2 \quad \text{Eq.1}$$

where $t_p$ is the temporal spacing between unmodulated pulses and $\tau$ is the pulse duration of each pulse, respectively.

Therefore, the optical pulses used for PPM should be of short duration since SNR performance improves as the pulse widths within the modulated pulse stream decrease. Pulse widths as short as 0.3 picoseconds may be desirable for a PPM optical communication system. However, it is also well known in the art that PPM performance will suffer if the shapes of the optical pulses vary or the amplitudes of the pulses vary on a pulse-to-pulse basis. Mode locking of a pulsed laser is a mature technique for producing equally spaced ultra-short identical pulses. It would be beneficial to use a mode locked laser in a PPM communication system if the equally spaced pulses produced by the system could be modulated without distortion.

Furthermore, the PPM system should be capable of supporting the modulation and transmission of analog signals with large bandwidths. Typically, a bandwidth of $\Delta f=1-10$ GHz and higher is of interest for inter-satellite communications. Since pulse repetition frequencies (PRF) of $1/t_p>2\Delta f$ are required for sampling a signal with a bandwidth of $\Delta f$, trains of picosecond pulses with a PRF over one gigahertz should be used for realizing the advantages of PPM. For example, an optical inter-satellite link designed to transmit waveforms with a bandwidth $\Delta f=20$ GHz requires a sampling rate with a PRF=$1/t_p \geq 2\Delta f=40$ GHz. At a sampling rate of 40 GHz and optical pulses with 1 picosecond duration, a 30 dB gain is realized over an AM system with equal optical power.

Implementations of PPM for optical communications require a mechanism for modulating the delays between extremely short optical pulses within a pulse stream without modulating the shapes or pulse-to-pulse amplitudes of the pulses. Direct modulation of a semiconductor laser will appropriately modulate the delay between the optical pulses generated by the laser. However, a directly modulated semiconductor laser generates relatively long pulses that result in limited SNR performance. Pulse compression can be used on the longer pulses produced by the directly modulated semiconductor laser, but devices to provide such compression are complex and cumbersome. Direct modulation of a semiconductor laser may also introduce amplitude modulation or pulse reshaping of the individual time-shifted pulses, further limiting performance.

Pulse position modulation of extremely short optical pulses is also achieved by applying a pulse-to-pulse delay external to the source of the equally spaced optical pulses. That is, a modulator is used that can receive a stream of optical pulses, change the pulse-to-pulse delay at the rate required for properly sampling the transmitted analog signal, and further transmit the delayed pulses. It is known in the art that one example of a pulse position modulator for optical pulses consists of an optical delay line, such as a parallel slab of transparent electro-optically active material. The refractive index of the electro-optically active material can be controllably varied by an applied voltage, so that each pulse is controllably delayed upon traversing the electro-optically active material in accordance with the instantaneous voltage. However, such a modulator requires an undesirably large amount of electrical power, due to the relatively large voltages required to modulate the refractive index of the material and thus modulate the delay encountered by a pulse traversing the material.

Another example of a pulse position optical modulator relying upon the use of electro-optically active material is disclosed in U.S. Pat. No. 3,961,841, issued Jun. 8, 1976 to Giordmaine. Giordmaine discloses a device for optical pulse position modulation comprising a diffraction grating in combination with an electro-optic prism and a lens. The diffraction grating splits an incident light pulse into its frequency components and the lens directs the components into the prism. The refractive index change provided by the prism causes a phase shift in the frequency components and thus a time shift in the optical pulse once it is reconstructed by the diffraction grating. The device disclosed by Giordmaine provides the capability of modulating light pulses as short as one picosecond. However, the maximum controllable delay is limited to a few picoseconds for a 3 picosecond pulse and further decreases for shorter pulses. Also, the multiplicity of optical elements such as the diffraction grating, lens, and prism increase the complexity and manufacturing cost of the device.

Figure 1:
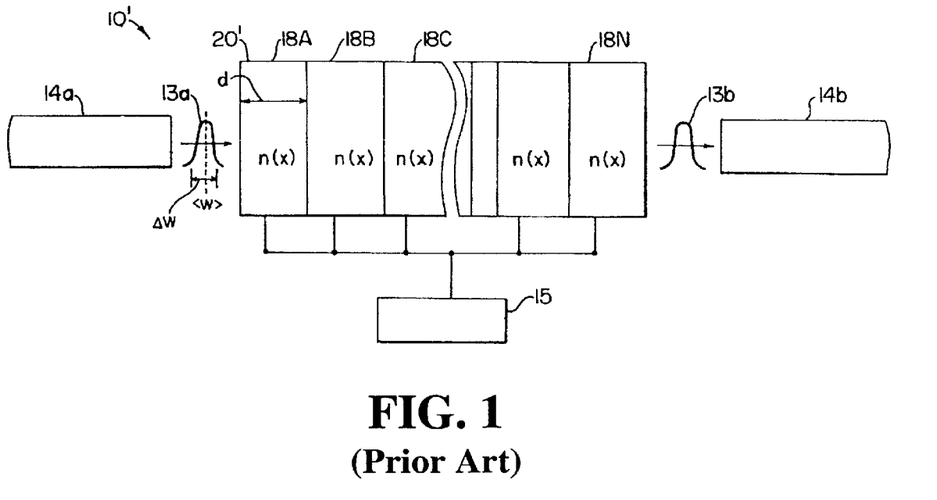
FIG. 1 (prior art) shows a photonic bandgap structure used for delaying optical pulses.

A device for delaying optical pulses is disclosed in U. S. Pat. No. 5,751,466, issued May 12, 1998 to Dowling et al. and is shown in FIG. 1. Dowling discloses a photonic bandgap structure comprising a plurality of cells 18A–18N of width d in which the refractive index varies. The refractive index variation may be such that each cell comprises two layers of materials with two different indices of refraction $n_1$ and $n_2$. If the widths of the two layers within each cell are $\lambda/4n_1$ and $\lambda/4n_2$ where $\lambda$ is the free space wavelength of the optical pulse to be delayed, a distributed Bragg reflector structure is created. According to Dowling, the thickness and/or number of layers in the photonic bandgap structure and/or their indices of refraction are selected to produce a structure with a transmission resonance center frequency and bandwidth corresponding to the frequency and bandwidth of the optical pulse to be delayed. By matching the transmission resonance to the optical pulse, a controllable delay is imparted to the optical pulse without significantly altering the optical signal.

The device disclosed by Dowling requires that the thickness of each layer in the device be approximately one-half the wavelength of the incident optical pulse to form the photonic bandgap structure. The delay imparted on an optical signal by transmission through the structure will depend upon the number of layers and the indices of refraction within the layers. The structure can be thought of as essentially increasing the length of the waveguide in which it is contained, thus providing the desired delay. For example, Dowling discloses a simulation of a photonic bandgap structure that is 7 µm thick that provides a delay equivalent to an optical signal traveling through a 110 µm structure, or a delay of about 0.4 picoseconds. Since the amount of delay from a single structure is relatively small, Dowling discloses that the structures can be successively coupled in a single device to provide additional delay. Of course, this increases the overall size of the device.

Dowling also discloses that changing the indices of refraction within the layers of the structure can vary the delay provided by a photonic bandgap structure. One way to accomplish this is to fabricate at least one of the layers from electro-optically active material. An applied voltage will then change the index of refraction in the layer to which the voltage is applied. FIG. 1 shows a voltage means 15 that applies a voltage to one or more of the layers within the device disclosed by Dowling. Varying the voltage would vary the delay, thus providing the controllable delay required for pulse position modulation. However, since the overall delay provided by the photonic bandgap structure is relatively small, it would follow that the change of delay provided by electro-optically changing the indices of refraction would only be some fraction, typically 0.1% or less, of that relatively small delay. Again, this limitation could be overcome by coupling successive structures, with a corresponding increase in the overall size of the structure.

Optical transmission media can be configured to reflect optical beams at specified wavelengths. One such configuration is accomplished through the use of a "Bragg grating" or "distributed Bragg reflector." A distributed Bragg reflector is provided by periodic variations in the refractive index of the optical media. The pattern of variations behaves as a spectrally selective reflector for electromagnetic radiation. The reflection of a distributed Bragg reflector reaches its maximum at the wavelength λ satisfying the Bragg condition:

$$\beta(\lambda)=\pi/\Lambda \qquad \text{Eq. 2}$$

where $\beta(\lambda)$ is the wave number at the given wavelength and $\Lambda$ is the period of modulation of the distributed Bragg reflector.

Figure 3:
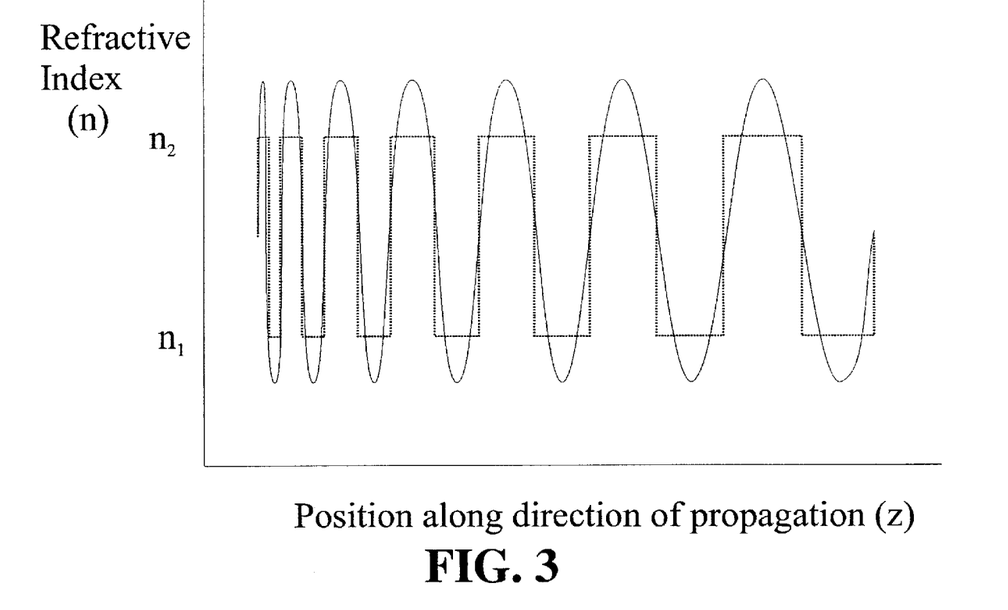
FIG. 3 shows a graphical representation of a typical variation in the refractive index required for a chirped distributed Bragg reflector.

A "chirped" distributed Bragg reflector is provided in optical media by quasiperiodic variations in the refractive index with the optical media. In a chirped distributed Bragg reflector (C-DBR), the period of the refractive index variation is not a constant, but instead changes in a predetermined fashion along the propagation axis of the C-DBR. The propagation axis of a C-DBR is the direction in which incident light travels in the optical media. A specific quasiperiodic variation in the refractive index is one in which the period of the refractive index variation increases or decreases as an approximately linear function of position along the propagation axis, resulting in a linearly chirped distributed Bragg reflector. FIG. 3 shows a linearly chirped variation of the refractive index n as a function of position z along the propagation axis.

Figure 2:
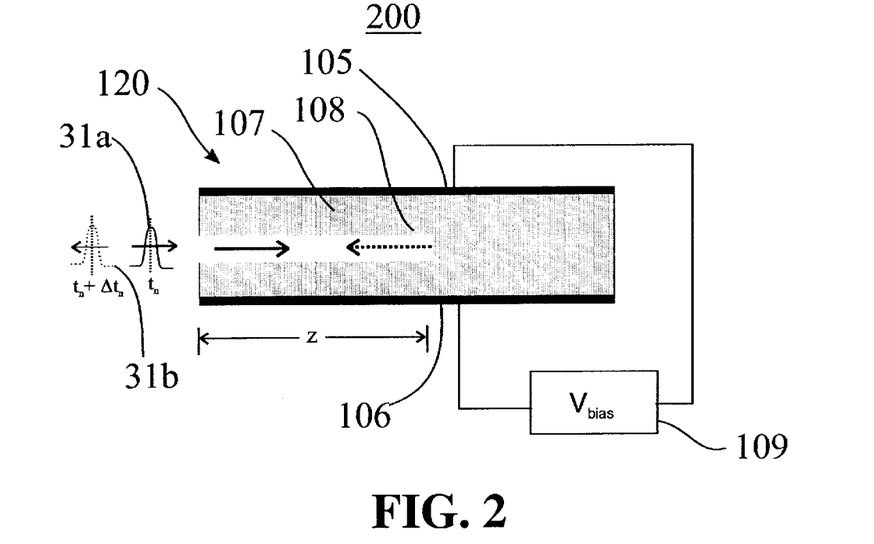
FIG. 2 shows an optical delay generator comprising a waveguide with two electrodes disposed on opposite sides of a layer of electro-optically active material having a chirped distributed Bragg reflector structure.

An electro-optic delay generator based on the use of a chirped distributed Bragg reflector is disclosed in the pending U.S. patent application Ser. No. 09/545,632, "Method and Apparatus for Electro-optic Delay Generation of Optical Signals," filed Apr. 7, 2000 and incorporated herein by reference. A delay generator 200 based on a C-DBR structure in an electro-optically active waveguide 120 is shown in FIG. 2. The refractive index of the electro-optically active layer 107 within the waveguide 120 is controlled by an electric field generated by electrodes 105, 106 disposed on both sides of the layer 107. In this delay generator 200, an optical pulse 31a is directed into the waveguide 120, is then reflected by the C-DBR structure within the waveguide 120, and is then directed out of the waveguide 120 as a delayed optical pulse 31b. The optical pulse is, therefore, delayed by the round trip travel time by the propagation of the pulse within the waveguide 120 to the C-DBR reflection point (as indicated by reference number 108 in FIG. 2) and the propagation of the pulse from the C-DBR reflection point 108 back out of the waveguide 120. Shifting the C-DBR reflection point 108 by using the electro-optic effect to change the refractive index within the waveguide 120 controls the delay of the optical pulse. The electro-optic effect arises due to the electric field generated between the two electrodes 105, 106 and connected to a voltage generator 109.

The delay generator 200 shown in FIG. 2 enables large (up to 10 picoseconds) temporal shifts in optical pulses. The C-DBR structure may be easily manufactured by doping lithium niobate with titanium. However the bandwidth of the delay generator 200 is limited, though, by the use of a constant modulation field applied by the bias voltage $V_{bias}$ during round-trip propagation of the optical pulse. That is, the bias voltage to apply a specific delay to a specific optical pulse can not be changed until that optical pulse has entered and exited the waveguide. This limits the bandwidth of a delay generator as shown in FIG. 2 with a length of 1 cm to a few Gigahertz.

The bandwidth of the delay generator 200 shown in FIG. 2 and described above may be increased by turning the electrodes into a matched RF transmission line, where the modulating field propagates at the same speed as the optical pulse in the electro-optically active layer. Thus, the forward propagating optical pulse always sees a constant modulating field that applies the correct delay to that pulse. Since the modulating field tracks the forward propagating pulse, there is no need to slow the change in the field until the pulse has exited the waveguide. The reflected pulse, however, experiences the incorrect electric field for the desired delay, which results in unwanted optical pulse shift and pulse broadening.

Figure 4:
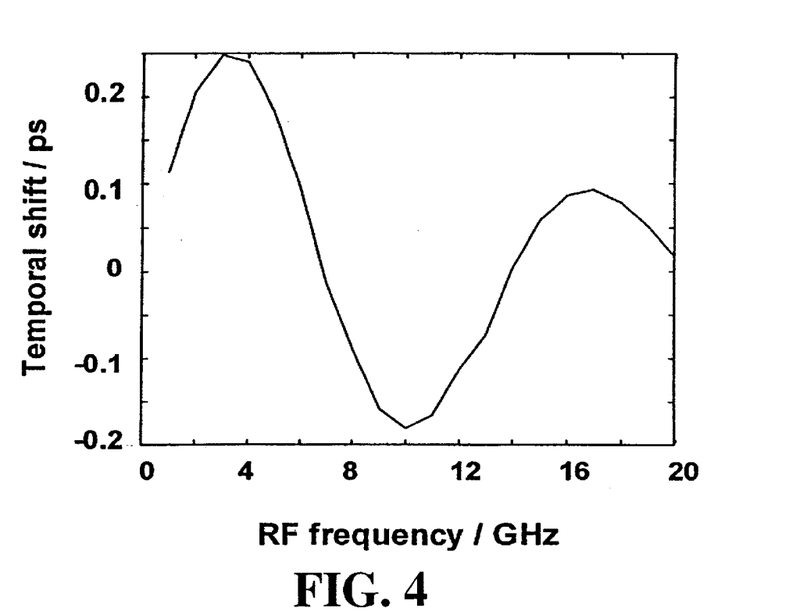
FIG. 4 shows the error in temporal shift that occurs when the electrodes of the delay generator shown in FIG. 2 are configured as RF transmission lines.

Numerical modeling was used to determine the magnitude of this effect. The model was generated based on a 1 picosecond optical pulse propagating in a 1 cm long device made of lithium niobate. The applied bias voltage corresponded to a desired temporal shift of 6 picoseconds. It was found that the dominant effect is an unwanted change in the desired phase shift, whereas the pulse broadening is relatively insignificant. The magnitude of the unwanted temporal shift versus the modulating frequency is shown in FIG. 4. Such unwanted temporal shifts distort the transmitted waveform and, thereby, reduce the fidelity of any pulse position modulation system incorporating such a delay generator using matched RF transmission lines as electrodes.

Therefore, there exists a need in the art for an delay generator for optical signals that provides for handling a wider bandwidth of optical signals without causing unwanted pulse shift or pulse broadening.

SUMMARY OF THE INVENTION

Accordingly, it is an object of the present invention to provide apparatus and methods for providing controllable delays to optical signals.

It is another object of the present invention to provide delay generation that may vary the controllable delays applied to individual optical signals over a wide bandwidth. It is a further object of the present invention to provide for wide bandwidth delay generation without causing unwanted temporal optical signal shifts or broadening of the optical signals.

These and other objects are provided by coupling optical signals into an optical structure comprising a first electro-optically active waveguide and a second waveguide disposed adjacent to the first waveguide. A chirped distributed Bragg reflector structure is formed within the first waveguide. The chirped distributed Bragg reflector will reflect optical signals into the adjacent waveguide at a reflection point based upon the wavelengths of the optical signals and the chirp of the reflector structure. The resonant conditions in the C-DBR are such that reflection cannot occur back into the same waveguide. Rather, the resonance forms the reflected beam in the adjacent guide. An electric field is applied across the first waveguide. Changes in the electric field intensity cause the index of refraction of the electro-optically active material to change, which shifts the reflection point for optical signals. A shift in the reflection point results in a shift in the amount of delay applied to an optical signal. Thus, the second waveguide produces delayed versions of the optical signals coupled into the first waveguide.

Preferably, the second waveguide is disposed such that no electric field is applied across it or is fabricated from non-electro-optically active material, so that changes in the electric field intensity only affect the index of refraction within the first waveguide. It is also preferred that the electric field is applied to the first waveguide by a pair of electrodes disposed such that the electro-optically active material is located between them and the electrodes project in the same direction as the direction of optical signal propagation within the first waveguide. Preferably, the electrodes are disposed so as to form a matched RF transmission line, in which the group velocity for RF signals applied to the transmission line is approximately equal to the group velocity for optical signals within the first waveguide.

An apparatus according to an embodiment of the present invention for delaying optical signals is provided by an optical delay generator comprising: a waveguide layer comprising: a first optical waveguide comprising electro-optically active material, said first waveguide having a longitudinal axis, wherein optical signals propagate within said waveguide in a direction substantially parallel to said longitudinal axis; a chirped distributed Bragg reflector structure formed within said first waveguide, said chirped distributed Bragg reflector structure having a direction of propagation substantially parallel to said longitudinal axis and reflecting optical signals in a direction substantially opposite to said direction of propagation; a second optical waveguide disposed adjacent to and substantially parallel to said first optical waveguide, said second optical waveguide resonantly coupled to said first optical waveguide to receive optical signals reflected by said chirped distributed Bragg reflector structure; an insulating layer disposed above said waveguide layer; a ground electrode disposed on said insulating layer and positioned above said second optical waveguide; and a signal electrode disposed on said insulating layer and positioned such that the first waveguide is located between and below said ground electrode and said signal electrode, said signal electrode being electrically isolated from said ground electrode.

A method for delaying optical signals according to an embodiment of the present invention is provided by the steps of: coupling optical signals into a first waveguide comprising electro-optically active material, said first waveguide having a chirped distributed Bragg reflector structure formed within said electro-optically active material, said chirped distributed Bragg reflector structure reflecting said optical signals at a reflection point within said structure to provide reflected optical signals; applying an electric field across said first waveguide to change an index of refraction of said electro-optically active material so as to change the position of said reflection point; coupling said reflected optical signals into a second waveguide, said second waveguide resonantly coupled to said first waveguide; and, directing said reflected optical signals out of said second waveguide to provide delayed optical signals.

Embodiments of the present invention provide pulse position modulated optical signals by directing a stream of equally spaced optical pulses into an optical delay generator according to the present invention. An electrical control signal applied to the delay generator causes each optical pulse to obtain a delay proportional to the control signal. The delayed optical pulses are then directed out of the optical delay generator. The delayed optical pulses, with reduced undesired pulse shift or pulse broadening, represent an optical pulse positioned modulated version of the control signal

DETAILED DESCRIPTION OF PREFERRED EMBODIMENTS

The present invention will now be described more fully hereinafter with reference to the accompanying drawings, in which preferred embodiments of the invention are shown. This invention may be embodied in many different forms and should not be construed as limited to the embodiments set forth herein. In the drawings, the thicknesses of layers and regions are exaggerated for clarity.

Figure 5A:
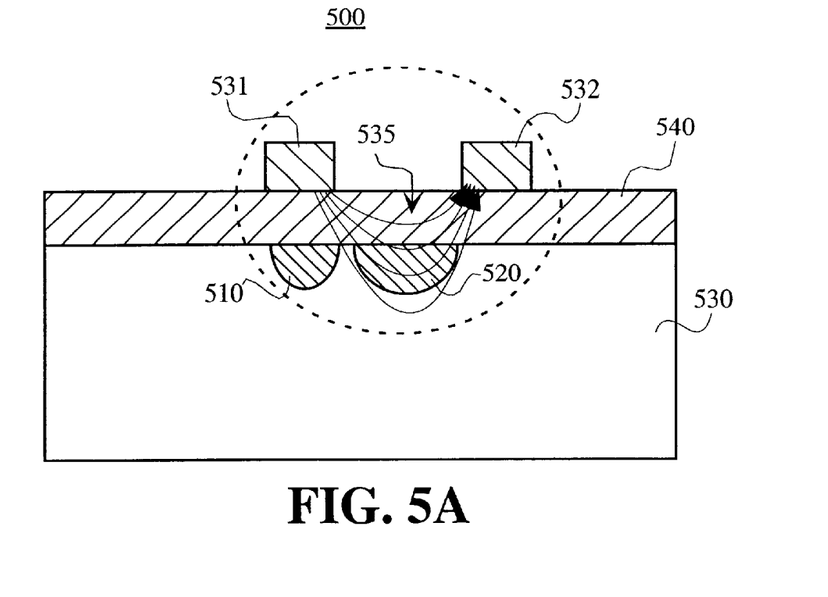
FIG. 5A shows a cross-section of an optical delay structure according to an embodiment of the present invention.
Figure 6:
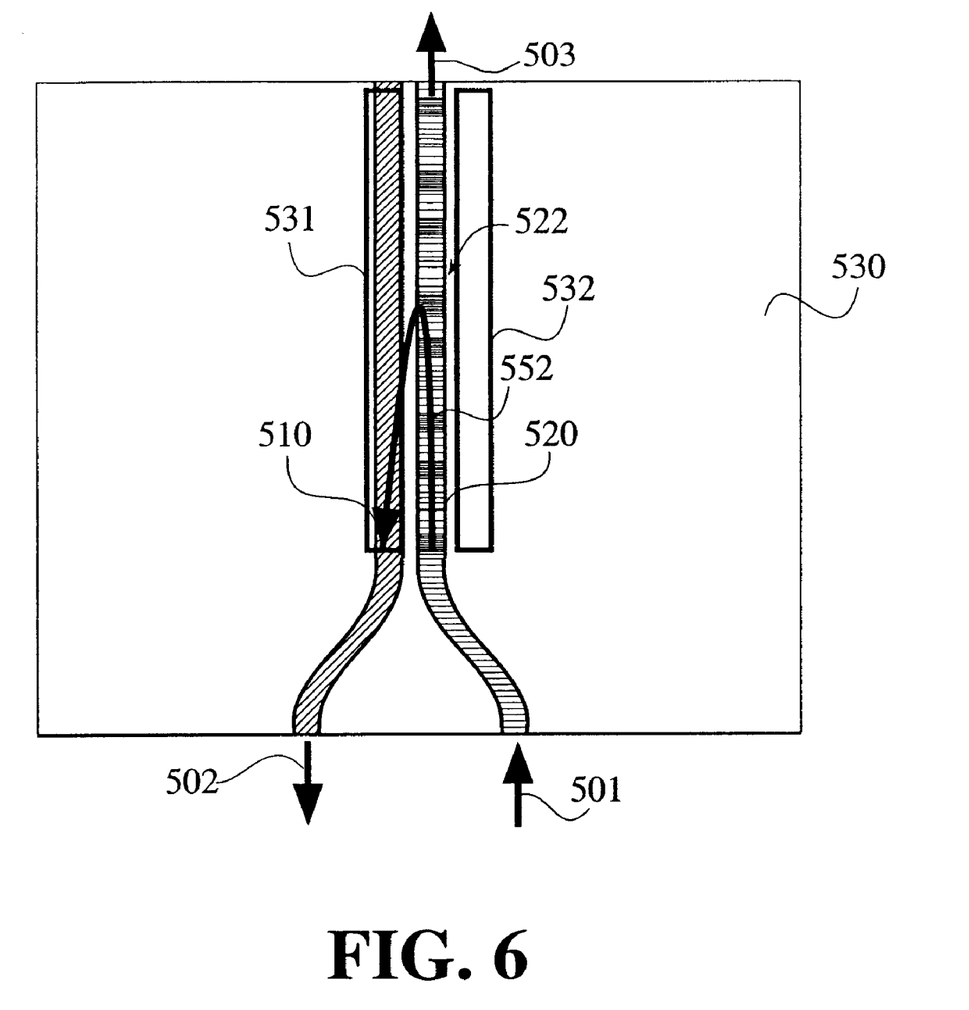
FIG. 6 shows a plan view of the delay generator shown in FIG. 5A.

The electro-optic delay generator 500 according to a preferred embodiment of the present invention is shown in cross-section in FIG. 5A. A plan view of the electro-optic delay generator is shown in FIG. 6. The delay generator 500 comprises two coupled waveguides 510, 520. In a preferred embodiment, the waveguides 510, 520 are grown on a wafer 530 comprising electro-optically active material, such as lithium niobate. The waveguides 510, 520 may be fabricated by depositing titanium on the lithium niobate wafer 530 through a photo-lithographic mask made on a photoresist, followed by photoresist lift-off and diffusion of the remaining titanium in a high temperature oven. Other optical element construction techniques known in the art may also be used. Preferably, the two waveguides 510, 520 have different propagation speeds (i.e., wavenumbers) for the optical signals transmitted within the waveguides. Different wavenumbers for the waveguides 510, 520 may be achieved by manufacturing the waveguides with different widths, as is known in the art.

One waveguide 520 is constructed so as to contain a C-DBR structure 522, as shown in FIG. 6. The C-DBR structure 522 may be created by one of several different techniques. Such techniques include (1) depositing additional titanium through a quasi-periodic photo-lithographic mask followed by lift-off and baking; (2) using e-beam lithography instead of photo-lithography; or (3) by making a quasi-periodic corrugation on the surface of the waveguide either by ion milling or laser ablation.

As discussed above, a C-DBR structure 522 results from a variation of the refractive index within an optical media as a function of distance within the optical media. A preferred variation in refractive index is shown below:

$$n(z) = n_0 \left[ 1 + 2h_0 \cos\left(2\pi \frac{z}{\Lambda_0}(1 + Cz)\right) \right] \qquad \text{Eq. 3}$$

for $-L/2 \leq z \leq L/2$, where $n_0$ is the average refractive index within the doped region, $h_0$ is the amplitude of the refractive index modulation, $\Lambda_0$ is the central modulation period, $C$ is the chirp parameter, and $L$ is the overall length of the C-DBR structure. In doped lithium niobate, $n_0 \approx 2.2$. Note that other variations in refractive index may also be used to form a C-DBR structure.

The waveguides 510, 520 are covered with an insulating layer of transparent material 540, such as silicon oxide, which separates the waveguides 510, 520 from electrodes 531, 532 deposited above the waveguides 510, 520. The insulating layer prevents the optical field of optical signals transmitted within the waveguides 510, 520 from reaching the electrodes, which is necessary to avoid unnecessary optical losses. Preferably, the insulating layer is thicker than 0.5 $\mu$m, but thinner than a few microns in order to achieve maximum electro-optic effect. A voltage difference between the electrodes 531, 532 will generate an electric field 535 between the two electrodes 531, 532.

The electrodes 531, 532 project in a direction that is substantially parallel to that of the waveguides 510, 520. Preferably, the electrodes 531, 532 are positioned so that the electric field strength across the waveguide 520 containing the C-DBR structure 522 is maximized over the length of the C-DBR structure 522, and the electric field strength across the other waveguide 510 is minimized. Thus, one waveguide 510 may be considered as being non-electro-optically active, while the other waveguide 520 is electro-optically active. One preferred configuration is where an X cut of lithium niobate is used, thus requiring a horizontal electric field across the electro-optically active waveguide 520 for maximal electro-optic effect. In FIG. 5A, the electro-optically active waveguide 520 is shown disposed in the space between and below a ground electrode 531 and a signal electrode 532. The non-electro-optically active waveguide 510 is located beneath the ground electrode 531, which acts as an electric shield and minimizes the electric field changes across the non-electro-optically active waveguide 510. Other cuts of lithium niobate and other electrode arrangements may also be used.

Preferably, the ground electrode 531 and the signal electrode 532 form an RF transmission line, in which an RF signal propagates substantially parallel to the direction that light propagates within the electro-optically active waveguide 520. Also preferably, the group velocity in the transmission line is approximately equal to that for optical signals in the electro-optically active waveguide 520. Velocity matching may be achieved by controlling the width of the electrodes 531, 532, the separation of the electrodes 531, 532, and/or by varying the width of the isolating layer 540. Methods for providing velocity matching described by K. C. Gupta, R. Garg, I. Bahl, and P. Bartia, Microstrip Lines and Slotlines, $2^{nd}$ edition, Artech House, 1996.

FIG. 6 illustrates the operation of a delay generator according to the present invention. An incident optical pulse 501 is directed into the electro-optically active waveguide 520. The incident optical pulse 501 will travel within the first waveguide 520 until it encounters the C-DBR reflection point. The optical pulse 501 will then be reflected. The reflection of the optical pulse is depicted in FIG. 6 by the line labeled 552. However, rather than propagating back through the electro-optically active waveguide 520, the central period of the C-DBR structure 522 provides resonant coupling between the forward propagating field in the electro-optically active waveguide 520 and the backward propagating optical field in non-electro-optically active waveguide 510. Hence, the backward traveling optical pulse 502 will travel through the non-electro-optically active waveguide 510. Since the C-DBR structure 522 is not a perfect reflector, a portion of the energy of the incident optical pulse 501 will continue to travel through the electro-optically active waveguide 520 and will be output as optical loss 503.

Figure 5B:
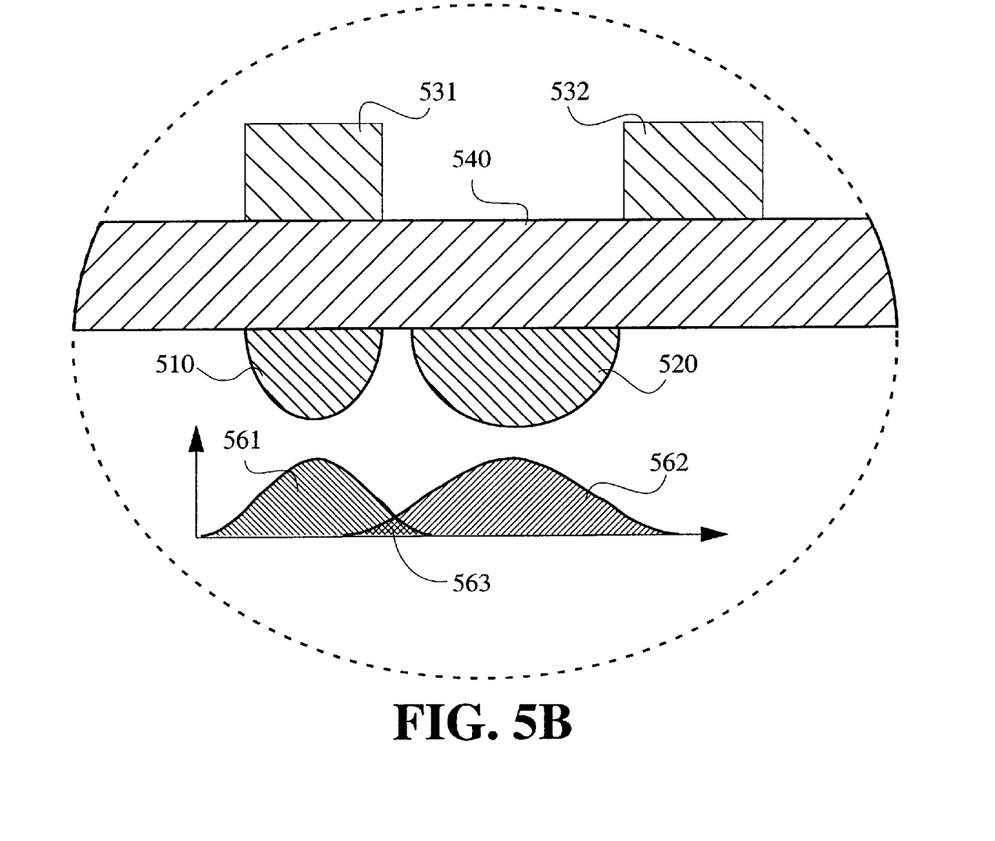
FIG. 5B shows an enlarged view of the waveguides and electrodes shown in FIG. 5A and the coupling of the optical modes in the waveguides

FIG. 5B shows an enlarged view of the waveguides 510, 520 and the electrodes 531, 532. FIG. 5B also depicts the optical modes 561, 562 supported by the waveguides 510, 520. Positioning the waveguides 510, 520 parallel to each other and close together allows the optical modes 561, 562 to slightly overlap, as shown by the overlap region 563. The overlap of the optical modes 561, 562 provides for resonant coupling between the waveguides 510, 520 that allows a reflected pulse to couple from the electro-optically waveguide 520 to the non-electro-optically active waveguide 510.

The effective resonant coupling strength of a C-DBR structure is given approximately as:

$$S = \kappa_0 L_{eff} \qquad \text{Eq. 4}$$

where $\kappa_0$ is the coupling constant between the forward propagating mode of the first waveguide and the backward propagating mode of the second waveguide and $L_{eff}$ is the effective length of the C-DBR structure. The effective length of the C-DBR structure is given as $$L_{eff} = \kappa_0 \Lambda_0 / \pi C \qquad \text{Eq. 5}$$

where $\Lambda_0$ is the central period of the C-DBR and $C$ is the chirp parameter.

The mode coupling constant is estimated roughly by using weakly guiding modes approximation and Gaussian mode structure, and may be calculated as:

$$\kappa_0 = \pi/\Lambda_0 h_0 \int_A e_f e_b dA / \sqrt{\int_A e_f^2 dA \int_A e_b^2 dA} \qquad \text{Eq. 6}$$

where $e_{f,b}$ are the electric fields of forward and backward propagating modes in the two guides, respectively, and $h_0$ is the amplitude of the refractive index modulation of the C-DBR structure in the electro-optically active waveguide.

We further assume cylindrically-symmetric Gaussian modes for both guides, which limits the accuracy of the estimations of coupling strength to that order of magnitude. The electric fields for Gaussian modes in both guides is:

$$e_{f,b}(x, y) = const \times \exp\left(\frac{-(x^2 + y^2)}{r_0^2}\right) \qquad \text{Eq. 7}$$

where:

$$r_0 = \frac{\rho}{(V-1)^{1/2}} \qquad \text{Eq. 8}$$

and $\rho$ is the radius (half width) of the waveguides and V is the V-number of the waveguides. Any differences in the widths of the two waveguides are ignored, since the estimates are only valid to an order of magnitude. The V-number of the waveguides is calculated by:

$$V = \frac{2\pi\rho n(2\Delta)^{1/2}}{\lambda_0} \qquad \text{Eq. 9}$$

where $\Delta$ is the difference between the refractive indexes of the doped and un-doped lithium niobate.
Substituting Eq. 7 into 6, the coupling constant is:

$$\kappa_0 = \frac{\pi}{\Lambda_0} h_0 \exp\left(\frac{-d^2(V-1)}{2\rho^2}\right) \qquad \text{Eq. 10}$$

where d is the distance between the waveguides. Hence, the effective coupling strength is approximately:

$$S = \frac{\kappa_0^2 \Lambda_0}{\pi C} \qquad \text{Eq. 11}$$

The location of the above reflection point in the C-DBR structure (and, thus, the pulse delay) is controlled via the electro-optic effect in the electro-optically active waveguide 520 resulting from a transverse electric field applied by the two electrodes 531, 532. Since the returning optical pulse propagates in the non-electro-optically active second waveguide 510, it is not affected by the electric field propagating in the forward direction across the electro-optically active waveguide 520. Therefore, the unwanted distortions previously described of unwanted pulse delays and pulse broadening are avoided, and the desirable delay characteristics of the C-DBR structure are fully preserved.

Resonant coupling between the forward propagating optical field in the first waveguide and the backward propagating optical field in the second waveguide is achieved by satisfying the following Bragg condition for the central wavelength of the optical pulse:

$$k_1 + k_2 = \frac{2\pi}{\Lambda_0} \qquad \text{Eq. 12}$$

where $k_1$ and $k_2$ are the wavenumbers for the central wavelength of the optical pulse propagating in the first and second waveguide respectively, and $\Lambda_0$ is the central period of the chirped DBR. The wavenumbers may be calculated approximately as $$k_{1,2} \approx 2\pi n_{1,2}/\lambda_0 \qquad \text{Eq. 13}$$

where $n_1$ and $n_2$ are the effective indices of refraction for the first and second waveguide, respectively, and $\lambda_0$ is the central wavelength of the optical pulse.

If both waveguides are fabricated on lithium niobate, its refractive index is typically $n_{1,2} \approx 2.2$. If the optical pulse is at the standard telecommunication wavelength of $\lambda_0 \approx 1.55$ $\mu$m, the central period of the chirped DBR is $$\Lambda_0 = \lambda_0/(n_1 + n_2) \approx 0.36 \ \mu\text{m} \qquad \text{Eq. 14}$$

The required chirp of the distributed Bragg reflector may be calculated as follows. Following the notations of Poladian, the required chirp may be calculated from a "detuning" factor, rather than wavelength. Detuning refers to deviation from Bragg resonance at a given wavelength and a given distance within the Bragg grating. For a given wavelength $\lambda$ of an optical signal, detuning $\delta$ in a chirped grating changes linearly with length as shown below:

$$\delta = \frac{k_1(\lambda) + k_2(\lambda)}{2} - \frac{\pi}{\Lambda_0} - \frac{2\pi Cz}{\Lambda_0} \qquad \text{Eq. 15}$$

where C is the chirp parameter.

Figure 7:
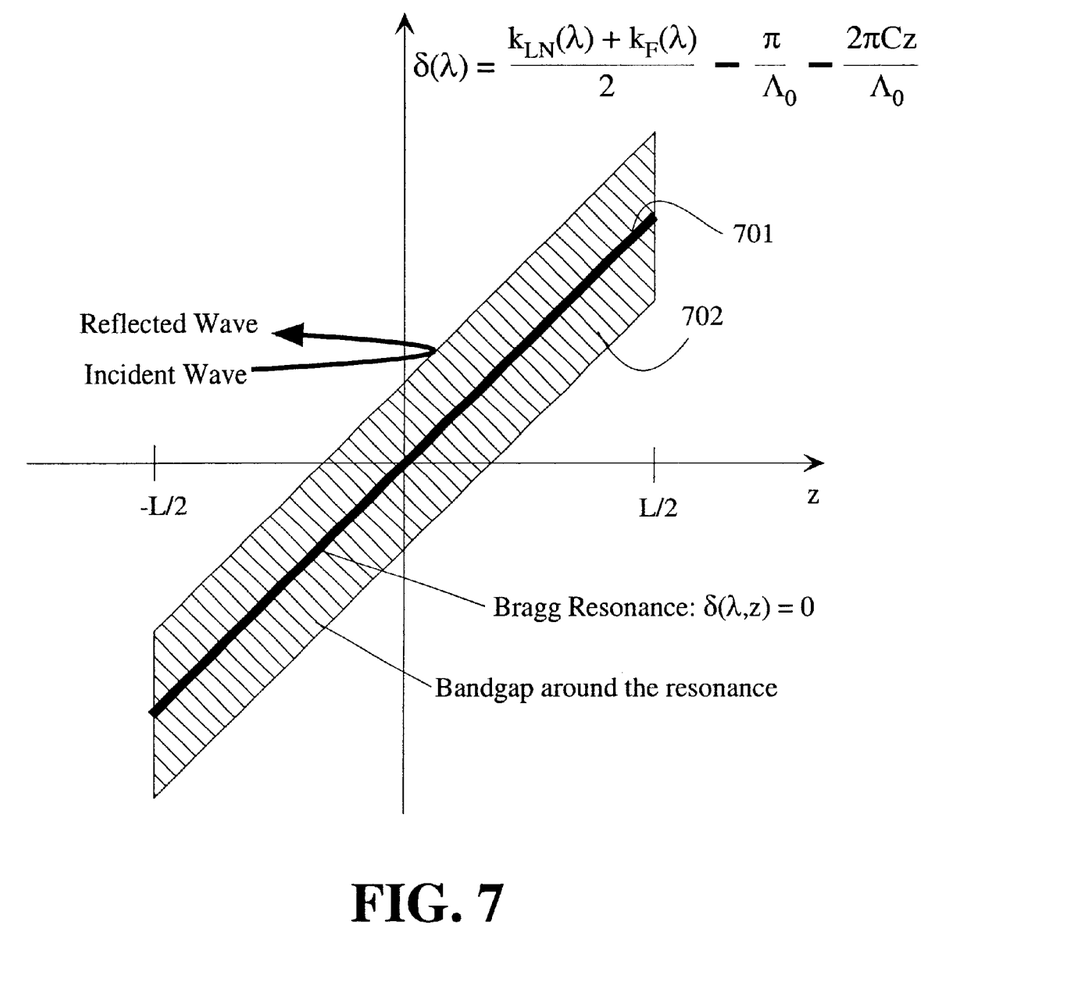
FIG. 7 shows a bandgap diagram for a chirped distributed Bragg reflector.

FIG. 7 shows a bandgap diagram of a chirped DBR structure where detuning $\delta$ is plotted versus z. The thick line 701 represents the evolution of the Bragg resonant condition along a chirped DBR, and the area 702 is the bandgap, where optical fields do not propagate, but, instead, are reflected by the chirped DBR structure. The bandgap 702 is defined as the set of frequencies that are reflected by the C-DBR structure.

The Bragg resonant condition may be derived from the approximation for the wavenumbers for the central wavelength of the optical pulse given by Equation 2 and from Equation 5, as shown below:

$$Cz \approx \Lambda_0 \frac{n_1 + n_2}{\lambda} - 1 \qquad \text{Eq. 16}$$

The total chirp across the entire C-DBR structure must be sufficient for covering the entire spectrum of the optical pulse, i.e. for every wavelength that has significant presence in the spectrum of the optical pulse, there must be a point in the C-DBR structure where the resonance condition is met. From Eq. 16, the resonant conditions at the beginning and end of the C-DBR are as follows:

$$-CL/2 = \Lambda_0 \frac{n_1 + n_2}{\lambda_{max}} - 1 \qquad \text{Eq. 17}$$

$$CL/2 = \Lambda_0 \frac{n_1 + n_2}{\lambda_{min}} - 1 \qquad \text{Eq. 18}$$

The minimum and maximum optical wavelengths reflected by the C-DBR can be calculated from Eqs. 17 and 18 as follows:

$$\lambda_{max} = \Lambda_0 \frac{n_1 + n_2}{1 - CL/2} \qquad \text{Eq. 19}$$

$$\lambda_{min} = \Lambda_0 \frac{n_1 + n_2}{1 + CL/2} \qquad \text{Eq. 20}$$

Thus, the spectral width accommodated by the C-DBR structure can be calculated as follows:

$$\Delta\lambda = \lambda_{max} - \lambda_{min} = \Lambda_0(n_1+n_2)\left(\frac{1}{1-CL/2} - \frac{1}{1+CL/2}\right) \quad \text{Eq. 21}$$
$$\approx \Lambda_0(n_1+n_2)CL$$

The full-width half-maximum spectral width of a Gaussian optical pulse is typically shown as $\delta\lambda_{FWHM}$. A spectral width of three FWHM should be sufficient for covering most of the spectrum of a Gaussian optical pulse. Therefore, the C-DBR structure reflecting a Gaussian pulse should accommodate a spectral width of $\Delta\lambda=3\delta\lambda_{FWHM}$. The central wavelength of the optical pulse may be found by:

$$\lambda_0=\Lambda_0(n_1+n_2) \quad \text{Eq. 22}$$

Since $\Delta\lambda=3\delta\lambda_{FWHM}$ and $\lambda_0=\Lambda_0(n_1+n_2)$, the chirp required for the C-DBR structure may be calculated as shown below:

$$3\delta\lambda_{FWHM} = \Lambda_0(n_1+n_2)CL = \lambda_0 CL \quad \text{Eq. 23}$$
$$C = \frac{3\delta\lambda_{FWHM}}{\lambda_0 L}$$

A Gaussian optical pulse of 1 picosecond duration (full-width half-maximum (FWHM)) has a spectral width of $\delta\lambda_{FWHM}$=3.55 nm (FWHM). Thus, for a pulse with a FWHM spectral width of $\delta\lambda_{FWHM}$=3.55 nm, the C-DBR structure should accommodate a spectral width of $\Delta\lambda\approx3\delta\lambda_{FWHM}\approx10$ nm. For $\delta\lambda_{FWHM}$=3.55 nm, $\lambda_0$=1550 nm, and L=1 cm, the chirp parameter C≈70 $\mu m^{-1}$. As shown in Eq. 23, proportionally smaller chirps are required for longer C-DBR structures.

The effective coupling strength for a Gaussian optical pulse can be calculated from Eqs. 10, 11 and 23 as shown below:

$$S = \frac{\pi h_0^2 L(n_1+n_2)}{3\delta\lambda_{FWHM}} \exp\left(\frac{-d^2(V-1)}{\rho^2}\right) \quad \text{Eq. 24}$$

where d is the distance between the waveguides.

Assuming $\Delta=5\times10^{-3}$, $\rho=2$ $\mu$m, $n_1\approx n_2\approx2.2$, and $\lambda=1.55$ $\mu$m, we get V=1.78. For d=1.5 $\mu$m, $\rho=3$ $\mu$m and $h_0=10^{-3}$, we get $S=3.6\times10^{-6}1/\delta\lambda_{FWHM}$. For L=1 cm and $\delta\lambda_{FWHM}$=3 nm, the coupling strength S≈1.2, which implies a reasonably strong, i.e., exp(-S) ≈30%, coupling between the forward propagating optical field in the electro-optically active waveguide and backward propagating field in the non-electro-optically active waveguide. Even stronger coupling is possible for longer C-DBR structures.

The group delay introduced by a chirped grating is, approximately, $$t_d=(n_1+n_2)z/c \quad \text{Eq. 25}$$

where c is the speed of light. Eq. 25 demonstrates that the group delay can be changed by changing the effective refractive index of the waveguide, for example, as a result of the electro-optic effect in the waveguide, as shown below in Eq. 26:

$$dt_d = \frac{(n_1+n_2)L}{3\delta\lambda_{FWHM}} \frac{\lambda_0}{c} dn_1 \quad \text{Eq. 26}$$

using $C\lambda_0=3\delta\lambda_{FWHM}/L$ according to Eq. 23.

For example, as shown below, the length and chirp of a C-BDR structure can be chosen to provide a given delay range for optical pulses of a certain duration. It is known that the electro-optic change in the refractive index of lithium niobate is given by Eq.27 below:

$$dn_1=r_{33}n_1^3 dE_2 \quad \text{Eq.27}$$

where the electro-optic coefficient $r_{33}$=30.8×10$^{-12}$ mV. Assuming a 3 $\mu$m-wide waveguide and 5V of applied voltage, the refractive change is $dn_1$=4.5×10$^{-4}$. For L=1 cm and $\delta\lambda_{FWHM}$=3.55 nm (1 picosecond pulse), the change in group delay $dt_d$≈2 ps. If larger delays are required, longer C-DBR structures may be used with proportionally smaller chirps. For example, a 6 ps delay may be obtained with the same voltage applied to a structure with a length L=3 cm and a chirp factor C=23 $\mu m^{-1}$.

Fast electro-optic modulators operating at 50 GHz or greater with lengths of 5 cm and longer constructed with titanium doping technology are known in the art. Electro-optic modulators with lengths of 1 cm are well known in the art. Hence, embodiments of the present invention as described above may be manufactured with techniques well known in the art.

From the foregoing description, it will be apparent to those skilled in the art that the present invention has a number of advantages, some of which have been described above, and others of which are inherent in the embodiments of the invention described herein. Also, it will be understood that modifications can be made to the electro-optic delay generator described herein without departing from the teachings of subject matter described herein. As such, the invention is not to be limited to the described embodiments except as required by the appended claims.

What is claimed is:

1. An optical delay generator comprising:
   a first optical waveguide comprising electro-optically active material, said first waveguide having a longitudinal axis, wherein optical signals propagate within said waveguide in a direction substantially parallel to said longitudinal axis;
   a chirped distributed Bragg reflector structure formed within said first waveguide, said chirped distributed Bragg reflector structure having a direction of propagation substantially parallel to said longitudinal axis and reflecting optical signals in a direction substantially opposite to said direction of propagation;
   a first elongate electrode disposed adjacent a first side of said first optical waveguide;
   a second elongate electrode disposed adjacent a second side of said first optical waveguide, wherein a voltage applied between said first electrode and said second electrode generates an electric field across said chirped distributed Bragg reflector structure, said electric field having a direction normal to said direction of propagation; and
   a second optical waveguide disposed adjacent to and substantially parallel to said first optical waveguide, said second optical waveguide being resonantly coupled to said first optical waveguide to receive optical signals reflected by said chirped distributed Bragg reflector structure.

2. The optical delay generator according to claim 1, wherein said second waveguide comprises non-electro-optically active material.

3. The optical delay generator according to claim 1, wherein said second waveguide comprises electro-optically active material and said second elongate electrode comprises a ground electrode, said second elongate electrode being disposed substantially above said second waveguide.

4. The optical delay generator according to claim 1, wherein said first electrode and said second electrode form a radio frequency transmission line, said radio frequency transmission line having a direction of propagation substantially parallel to a direction of propagation of the optical signals in the first optical waveguide.

5. The optical delay generator according to claim 1, wherein the waveguides are fabricated on a lithium niobate wafer.

6. The optical delay generator according to claim 5, wherein the waveguides are fabricated by depositing titanium on said lithium niobate wafer.

7. The optical delay generator of claim 5, wherein said lithium niobate wafer comprises an X cut of lithium niobate.

8. The optical delay generator according to claim 1, further comprising an insulating layer between said waveguides and said electrodes.

9. The optical delay generator of claim 8 wherein said insulating layer comprises silicon oxide.

10. The optical delay generator of claim 8, wherein said insulating layer is thicker than 0.5 $\mu$m.

11. The optical delay generator of claim 4, wherein radio frequency signals propagate in said transmission line with a group velocity substantially equal to a group velocity of said optical signals propagating in said first optical waveguide.

12. The optical delay generator of claim 1, wherein the first optical waveguide and the second optical waveguide have different wavenumbers.

13. The optical delay generator of claim 1, wherein an index of refraction n within the chirped distributed Bragg reflector structure varies with position z within the chirped distributed Bragg reflector structure according to an equation as follows:

$$n(z) = n_0 \left[ 1 + 2h_0 \cos\left(2\pi \frac{z}{\Lambda_0}(1 + Cz)\right) \right]$$

where $n_0$ is an average refractive index within the chirped distributed Bragg reflector structure, $h_0$ is an amplitude of a refractive index modulation, $\Lambda_0$ is a central modulation period, and C is a chirp parameter.

14. A method for delaying optical signals, said method comprising the steps of:
coupling optical signals into a first waveguide comprising electro-optically active material, said first waveguide having a chirped distributed Bragg reflector structure formed within said electro-optically active material, said chirped distributed Bragg reflector structure reflecting said optical signals at a reflection point having a position within said structure to provide reflected optical signals;
applying an electric field across said first waveguide to change an index of refraction of said electro-optically active material so as to change the position of said reflection point;
coupling said reflected optical signals into a second waveguide, said second waveguide resonantly coupled to said first waveguide; and,
directing said reflected optical signals out of said second waveguide to provide delayed optical signals.

15. The method of claim 14, wherein said first waveguide and said second waveguide have different wavenumbers.

16. The method of claim 14, wherein the step of applying an electric field is provided by a pair of electrodes disposed on either side of said first waveguide.

17. The method of claim 14, wherein said second waveguide comprises non-electro-optically active material.

18. The method of claim 16, wherein said second waveguide comprises electro-optically active material and said pair of electrodes comprise a signal electrode disposed adjacent said first waveguide and a ground electrode disposed substantially above said second waveguide.

19. The method of claim 16, wherein said pair of electrodes comprise a radio frequency transmission line and radio frequency signals transmitted in said radio frequency transmission line have a group velocity substantial equal to a group velocity of optical signals transmitted in said first waveguide and said second waveguide.

20. The method of claim 14, wherein an index of refraction n within the chirped distributed Bragg reflector structure varies with position z within the chirped distributed Bragg reflector structure according to an equation as follows:

$$n(z) = n_0 \left[ 1 + 2h_0 \cos\left(2\pi \frac{z}{\Lambda_0}(1 + Cz)\right) \right]$$

where $n_0$ is an average refractive index within the chirped distributed Bragg reflector structure, $h_0$ is an amplitude of a refractive index modulation, $\Lambda_0$ is a central modulation period, and C is a chirp parameter.

21. An optical delay generator comprising:
a waveguide layer comprising:
a first optical waveguide comprising electro-optically active material, said first waveguide having a longitudinal axis, wherein optical signals propagate within said waveguide in a direction substantially parallel to said longitudinal axis;
a chirped distributed Bragg reflector structure formed within said first waveguide, said chirped distributed Bragg reflector structure having a direction of propagation substantially parallel to said longitudinal axis and reflecting optical signals in a direction substantially opposite to said direction of propagation; and
a second optical waveguide disposed adjacent to and substantially parallel to said first optical waveguide, said second optical waveguide resonantly coupled to said first optical waveguide to receive optical signals reflected by said chirped distributed Bragg reflector structure;
an insulating layer disposed above said waveguide layer;
a ground electrode disposed on said insulating layer and positioned above said second optical waveguide; and
a signal electrode disposed on said insulating layer and positioned such that the first waveguide is located between and below said ground electrode and said signal electrode, said signal electrode being electrically isolated from said ground electrode.

22. The optical delay generator of claim 21, wherein said waveguide layer comprises a lithium niobate wafer.

23. The optical delay generator of claim 22, wherein said first optical waveguide and said second optical waveguide are formed by doping said lithium niobate wafer.

24. The optical delay generator of claim 22, wherein said lithium niobate wafer comprises an X cut of lithium niobate.

25. The optical delay generator of claim 21, wherein said ground electrode and said signal electrode form a radio frequency transmission line and radio frequency signals propagate in said transmission line with a group velocity substantially equal to a group velocity of optical signals propagating in said optical waveguides.

26. The optical delay generator of claim 21 wherein said insulating layer comprises silicon oxide.

27. The optical delay generator of claim 21, wherein said insulating layer is thicker than 0.5 μm.

28. The optical delay generator of claim 21, wherein the first optical waveguide and the second optical waveguide have different wavenumbers.

29. The optical delay generator of claim 21, wherein an index of refraction n within the chirped distributed Bragg reflector structure varies with position z within the chirped distributed Bragg reflector structure according to an equation as follows:

$$n(z) = n_0\left[1 + 2h_0\cos\left(2\pi\frac{z}{\Lambda_0}(1 + Cz)\right)\right]$$

where $n_0$ is an average refractive index within the chirped distributed Bragg reflector structure, $h_0$ is an amplitude of a refractive index modulation, $\Lambda_0$ is a central modulation period, and C is a chirp parameter.

* * * * *